United States Patent
Reiger

(10) Patent No.: US 6,202,348 B1
(45) Date of Patent: *Mar. 20, 2001

(54) PLANT-GROWING METHOD AND APPARATUS

(76) Inventor: Ralph E. Reiger, 7505 N. Broadway, Oklahoma City, OK (US) 73116

( * ) Notice: Subject to any disclaimer, the term of this patent is extended or adjusted under 35 U.S.C. 154(b) by 0 days.

This patent is subject to a terminal disclaimer.

(21) Appl. No.: 09/102,613

(22) Filed: Jun. 22, 1998

Related U.S. Application Data

(63) Continuation-in-part of application No. 08/907,281, filed on Aug. 6, 1997, now Pat. No. 5,768,825, which is a continuation of application No. 08/691,442, filed on Aug. 2, 1996, now Pat. No. 5,799,251, which is a continuation of application No. 08/384,969, filed on Feb. 7, 1995, now abandoned.

(51) Int. Cl.⁷ ..................................................... A01G 9/02
(52) U.S. Cl. ..................................................... 47/78; 47/73
(58) Field of Search .................................. 47/76, 78, 73

(56) References Cited

U.S. PATENT DOCUMENTS

| | | | |
|---|---|---|---|
| 1,464,534 | 8/1923 | Lovett, Jr. . | |
| 1,894,506 | 1/1933 | Wilson . | |
| 2,017,308 | 10/1935 | Elmer . | |
| 2,252,073 | 8/1941 | Gray | 47/37 |
| 2,749,964 | 6/1956 | Manning | 154/1 |
| 2,758,419 | 8/1956 | Schmitz | 47/37 |
| 2,902,795 | 9/1959 | Heigl et al. | 47/58 |
| 3,094,810 | 6/1963 | Kalpin | 47/37 |
| 3,415,012 | 12/1968 | Stubbmann | 47/37 |
| 3,634,970 | 1/1972 | Williams | 47/37 |
| 3,678,620 | 7/1972 | Voges . | |
| 3,691,004 | 9/1972 | Werner et al. | 161/150 |
| 3,988,519 | 10/1976 | Stoller | 428/15 |
| 4,042,655 | 8/1977 | Platt et al. | 264/25 |
| 4,098,021 | 7/1978 | Gruber | 47/66 |
| 4,154,889 | 5/1979 | Platt | 428/234 |
| 4,199,644 | 4/1980 | Platt | 428/300 |
| 4,574,522 | 3/1986 | Reiger et al. | 47/78 |
| 4,613,529 | 9/1986 | Yamashita et al. | 428/15 |
| 4,697,382 | 10/1987 | Koeniger | 47/66 |
| 4,729,913 | 3/1988 | Matsui et al. | 428/15 |

(List continued on next page.)

FOREIGN PATENT DOCUMENTS

| | | | |
|---|---|---|---|
| 2161297 | 6/1973 | (DE) | 47/78 |
| 2744143 | 4/1979 | (DE) | 47/78 |
| 3304352 | 11/1983 | (DE) | 47/73 |
| 172060 | 2/1986 | (EP) | 47/73 |
| 1597853 | 8/1970 | (FR) | 47/78 |
| 2280314 | 2/1976 | (FR) | 47/9 |
| 2045044 | 2/1983 | (GB) . | |
| 7335081 | 10/1973 | (JP) | 47/73 |
| 406141708 | 5/1994 | (JP) | 47/78 |
| 307774 | 7/1971 | (SU) | 47/76 R |
| 84/04227 | 11/1984 | (WO) | 47/76 |

OTHER PUBLICATIONS

Article entitled "Nursery Performance of Selected Shade–Tree Species Grown in 'Field–Grow' Fabric Containers," by W. R. Remphrey, S. R. Rimmer and M. J. Blouw, *Canadian Journal of Plant Science*, vol. 70, pp. 337–343 (Jan. 1990).

Root Control Bag Growing System brochure entitled "The Tapered Bag" (undated but admitted to be prior art).

*Primary Examiner*—Michael J. Carone
*Assistant Examiner*—Joanne C. Downs
(74) *Attorney, Agent, or Firm*—McAfee & Taft

(57) ABSTRACT

A plant-growing method and apparatus are provided. The apparatus includes an impermeable pot having a fabric liner closely received therein. The liner is formed of a porous fabric which catches plant roots and directs the roots into the wall of the pot thereby preventing root circulation. The apparatus stops the apical dominance of the roots by directing them into the wall of the pot and therefore induces root branching within the pot.

3 Claims, 6 Drawing Sheets

U.S. PATENT DOCUMENTS

| | | | |
|---|---|---|---|
| 4,884,367 | 12/1989 | Lawton | 47/78 |
| 4,888,914 | 12/1989 | Reiger | 47/78 |
| 4,941,282 | 7/1990 | Milstein | 47/58 |
| 5,103,588 | 4/1992 | Reiger | 47/78 |
| 5,142,821 | 9/1992 | Bell | 47/76 |
| 5,167,092 | 12/1992 | Reiger | 47/78 |
| 5,311,700 | 5/1994 | Thomas | 47/76 |
| 5,368,353 | 11/1994 | Flanders et al. | 294/152 |
| 5,393,313 | 2/1995 | Reiger | 47/58 |
| B1 4,884,367 | 11/1994 | Lawton | 47/78 |

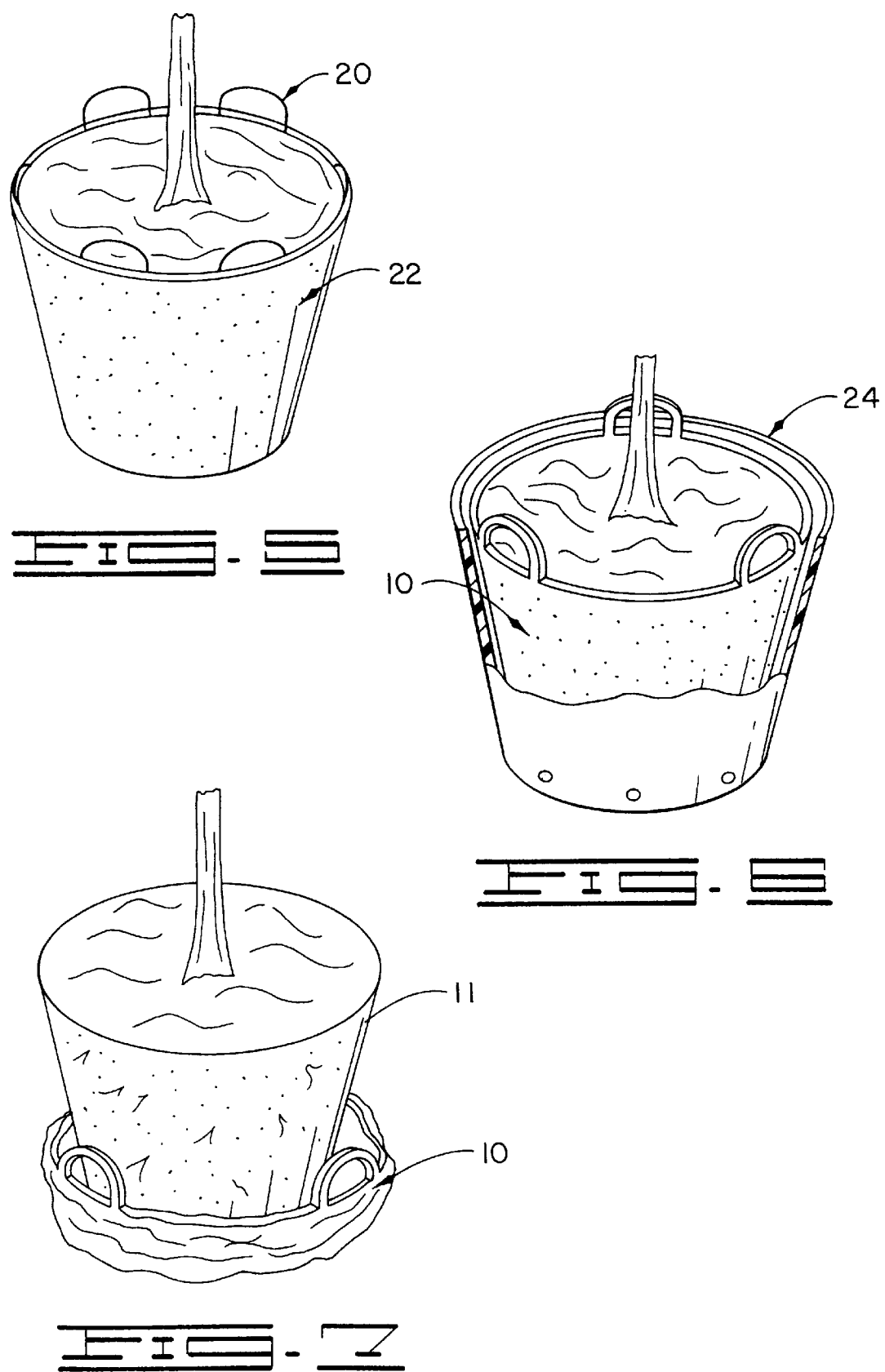

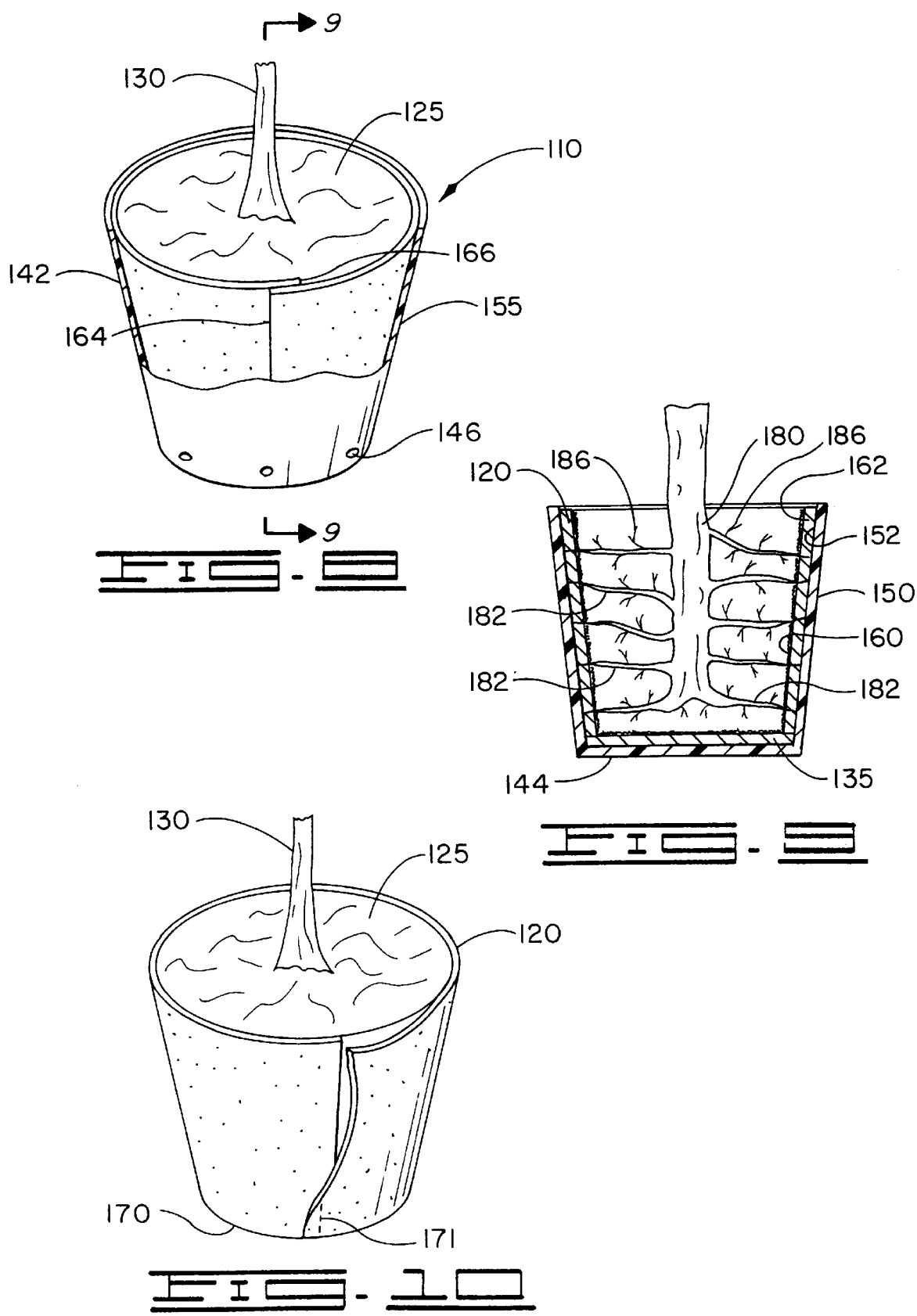

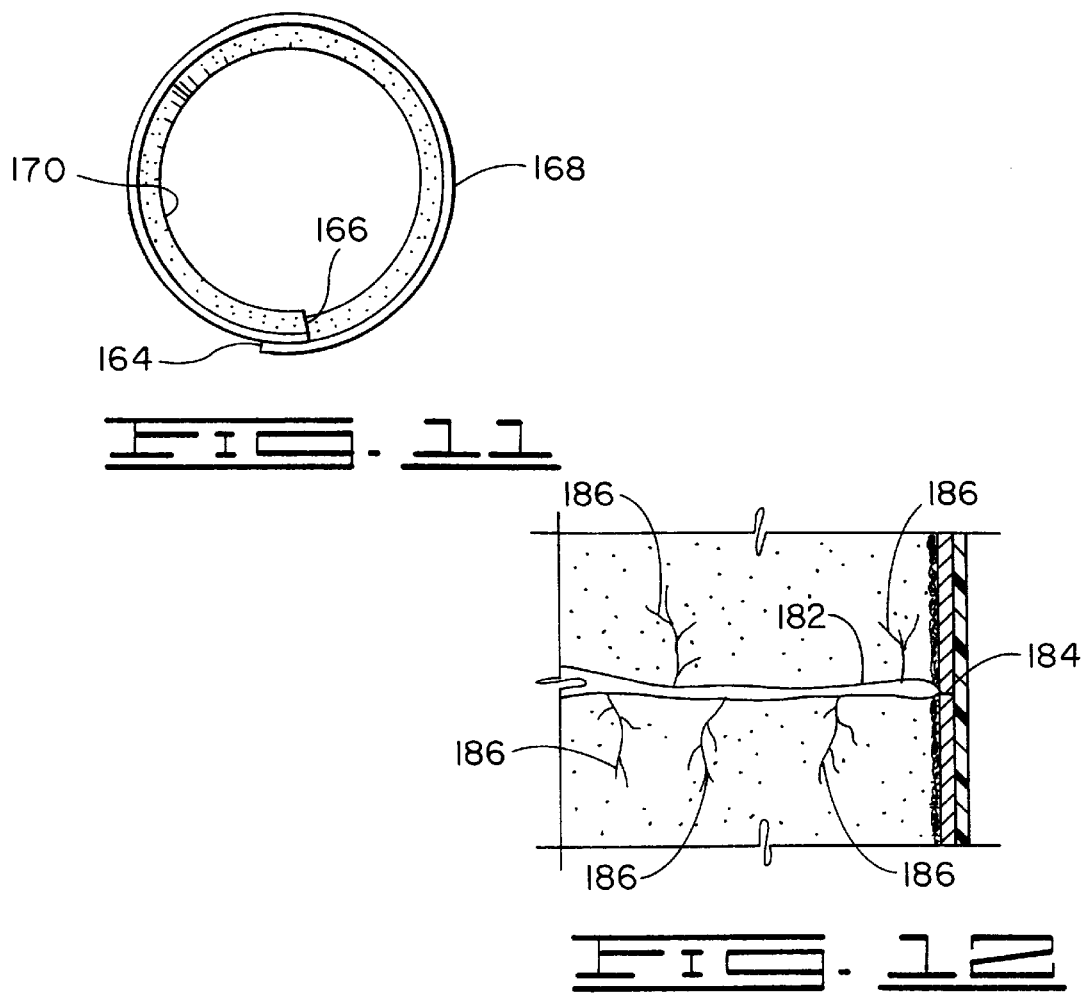

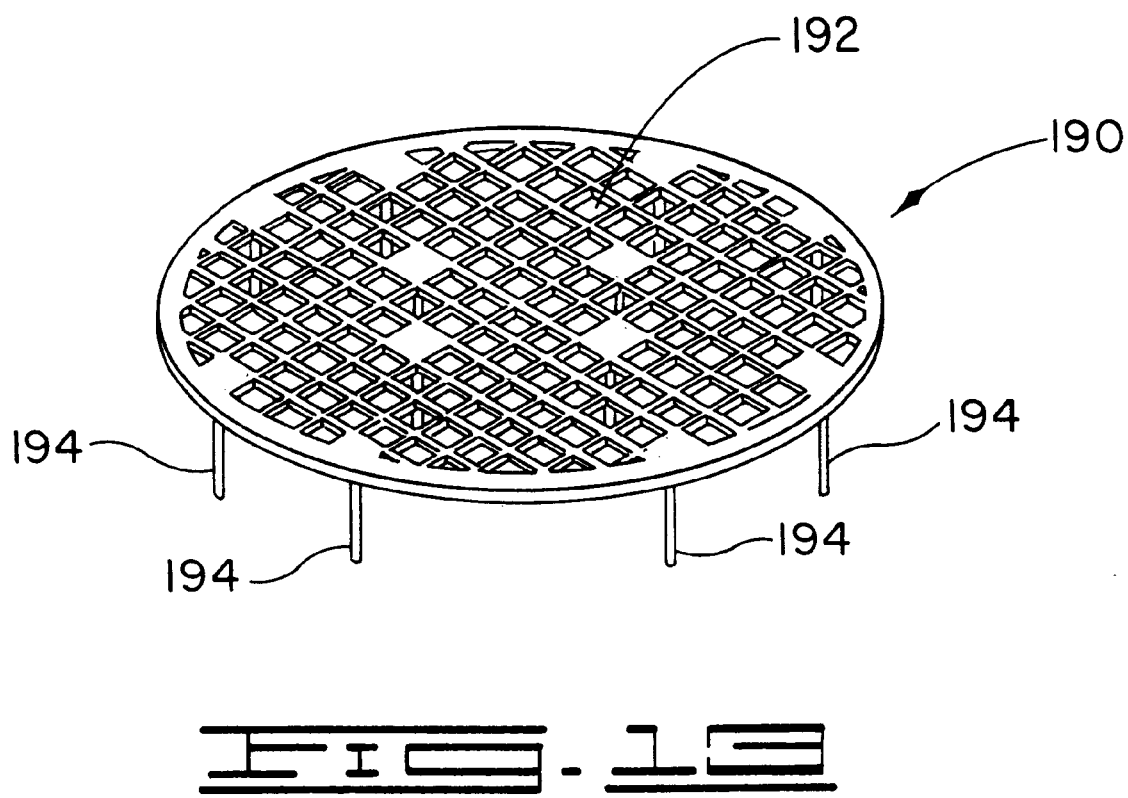
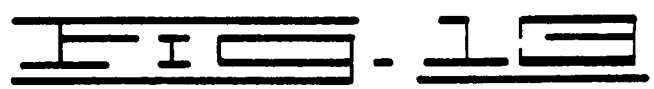

PLANT-GROWING METHOD AND APPARATUS

The present application is a continuation-in-part of U.S. patent application Ser. No. 08/907,281, filed Aug. 6, 1997, now U.S. Pat. No. 5,768,825 which was a continuation of U.S. patent application Ser. No. 08/691,442, filed Aug. 2, 1996, now U.S. Pat. No. 5,799,251, which was a continuation of U.S. patent application Ser. No. 08/384,969, filed Feb. 7, 1995, now abandoned.

BACKGROUND OF THE INVENTION

The present invention relates to a plant-growing method and apparatus for growing a plant and more particularly to an improved method and apparatus for growing nursery stock planted in above-ground containers. Numerous methods for growing nursery stock to desired transplantation size have been utilized for years, including growing of nursery stock in above-ground containers and in the ground prior to transplanting.

The most widely used method of growing and producing relatively large sized landscape plants, e.g., trees and shrubs, is field growing. Millions of plants are planted in the field each year by growers with the intent to market the resulting grown plants several years later. For example, the number of small oak trees the grower plants in 1994 is governed by the number of grown oak trees, with 3" trunk diameter, standing 15 feet tall he estimates he can sell in 1998. The efficient grower wants to maximize his full capabilities. Therefore, the ultimate plan is to plant and grow the number of plants, of each species, the grower can sell several years later. Of course, accurately judging this futures market is a very difficult task, and consequently, many plants are grown and ready for sale with no ready market.

The plants are dug from the field after growing to the desired sale size. Most plants are dug using the ball and burlap method, either by hand or machine. An earth-root ball is formed and wrapped in burlap to hold the ball together. Wire baskets are also put around the ball to further secure it in handling and shipping until the plant is sold.

The time frame from digging to sale date always varies from days, weeks to many months. All during the time from digging the relatively large plants until they are ultimately replanted in a landscape situation, the plants must be properly cared for. The foremost consideration is keeping the root balls securely intact and providing sufficient water to the plants. It is during this time period when the plants have limited root systems with limited reservoirs for nutrients and moisture that they are most subject to stress.

The most common method heretofore employed in an attempt to accomplish the required plant care has been to place the plants in holding bins where the root balls are surrounded and covered by some type of mulching material (sawdust, wood chips, etc.) The mulching material holds the moisture and prevents drying of the root balls. The primary problems associated with this practice are that the burlap rots away and the root ball begins to deteriorate necessitating reburlapping with new material to hold the root balls together, and when the plants come out of dormancy (springtime), the leaves, stems and roots start new growth. The new root growth extends out of the root balls into the surrounding soil or growing media, and when the plants are removed from the soil or media the new root growth is lost causing the plants to suffer shock which leads to poor transplantation results.

Methods of growing nursery stock in the ground prior to transplanting such nursery stock whereby the root growth is confined in a porous fabric container are disclosed in U.S. Pat. No. 4,574,522 issued to Reiger et al., on Mar. 11, 1986, U.S. Pat. No. 4,888,914 issued to Reiger on Dec. 26, 1989, U.S. Pat. No. 5,103,588 issued to Reiger on Apr. 14, 1992, and U.S. Pat. No. 5,167,092 issued Dec. 1, 1992, to Reiger. In accordance with those methods, nursery stock, e.g., a seedling tree is confined within a porous fabric container and planted in the ground within the container. The porous fabric container has sufficient strength to restrict the root but does not completely stop penetration. The bag root prunes by choking or girdling the root as it passes through the fabric. Root growth outside the container by those roots penetrating the fabric is limited and enlarged root nodule formation and root branching take place within the fabric container. The roots that do penetrate the fabric and go into the surrounding soil bring in moisture, nutrients and help anchor the tree. Upon transplanting the nursery stock, the fabric container and nursery stock are unitarily removed from the ground and the restricted root growth outside the fabric container readily breaks off. When transplanted, the fabric container is removed from the root ball and the root ball is placed in the ground. Because of the nodule formation and root branching which took place in the fabric container, the root structure rapidly establishes itself anchoring the plant and allowing it to intake moisture and nutrients.

While the methods of the above-described patents are very useful and successful in growing nursery stock for transplantation, growing of nursery stock, such as trees and the like, in above-ground pots or boxes has been and continues to be a viable, desirable commercial practice. The root systems of plants grown in such pots or boxes are totally confined therein. Thus, as the plant reaches the desired selling or transplantation size appropriate to the size of the pot or box in which it is being grown, root circling commences. It has long been recognized that root circling leads to poor transplanting results and even eventual death of the plant. Typically, the pots utilized to grow nursery stock are plastic pots. When plants are grown in plastic pots, the plant roots hit the smooth plastic on the inside of the container and circle. Because root circling is harmful to the plant when it is transplanted from the pot, prohibiting such circling is a desired effect, and an important issue within the nursery industry. Likewise, forcing a root to prune and branch is also a desired result.

Currently, the nursery industry utilizes three methods to stop root circling and to root prune in plastic containers. The first method is an air root pruning pot. Such pots are well known in the art. With air root pruning, the root tip is killed and thus pruned, when it hits the air, and the root will begin to branch in the pot.

The second method utilized to stop root circling involves using a copper paint to line the plastic pot. When the root tips of the plant being grown in such a pot reach the copper lining, the tips are burned and killed, and thus are pruned. Root circling is thus prohibited and the roots branch in the growing medium.

The third method comprises utilizing a plastic pot with a stair step root pruning structure defined on an inner surface thereof. Such a pot is disclosed in U.S. Pat. No. 4,442,628 to Whitcomb, the details of which are incorporated herein by reference. Root tips of plants grown in such pots may be trapped in the corners of the stair step root pruning structure, so that the roots lose their apical dominance and begin to branch in the pot.

Although each of the above-referenced methods works to root prune, each has its disadvantages. A copper-lined pot will work only one time, and must be relined if it is to be utilized again as a root pruning pot. Copper can also be toxic to plants, workers and the environment if misused. The stair step pot is far more expensive to manufacture than the typical plastic pot utilized to grow nursery stock. Additionally, the stair step pot does not hold up well in use, especially during shipping and handling. The edges and joints of the stair step structure are particularly weak points. The traditional plastic pot is round and has no such joints or edges, and is therefore considerably stronger.

Air root pruning pots are also far more expensive than traditional plastic pots. In addition, because air root pruning pots are made with joints at the edges and seams, they are far weaker in use than the traditional round plastic pots. This weakness is especially evident when plants are shipped and handled in the air pruning pots. Because of these weaknesses and the expense, air root pruning pots although commonly used in the nursery industry at smaller sizes of one gallon or less, are rarely used to produce larger sized plants of three gallons or more.

Thus, there is a need for an improved method and apparatus of growing a plant in an above-ground container.

SUMMARY OF THE INVENTION

The above needs are met by the present invention which provides a novel plant-growing method and apparatus for growing nursery plants and the like in above-ground pots. The apparatus of the present invention comprises an impermeable pot, preferably a plastic pot, having an inner surface and an outer surface. The apparatus further includes a fabric liner closely received in the pot. The pot is at least partially filled with growing media in which a nursery stock plant or other plant to be grown is placed. The liner preferably has overlapping ends and when placed in the pot has an open top and an open bottom. The apparatus may further include a fabric disc positioned on the bottom of the pot. The fabric liner is of an overall size and configuration such that it fits snugly within the pot so that the outer surface of the liner is adjacent the inner surface of the pot.

The fabric liner is preferably comprised of a porous, needle-punched fabric of fibers which are tangled and knotted as a result of being needle-punched which creates a rough, or fuzzy surface capable of trapping, or catching plant roots. The fabric is preferably heat-bonded on the outer surface thereof to create a smooth surface and to provide stiffness to the sleeve. The outer smooth surface will be placed adjacent the inner surface of the pot, so that the fuzzy inner surface of the sleeve is utilized to trap the roots of the growing plant and direct those roots into the side of the pot.

Because the roots are captured by the liner and directed into the side of the pot, the apical dominance of the roots is stopped, thus pruning the roots so that no further apical growth will occur. However, root branching will occur and a fibrous root system within the pot is created. Because of the root branching which takes place in the pot, the plant, when transplanted, will re-establish itself and anchor itself quickly and effectively.

The method for growing plants intended for transplanting thus comprises a method of confining the roots of the plants to an above-ground pot filled with growing media and inserting a removable and reusable liner into the pot prior to filling with the growing media. The pot is impermeable, except that it may have drain holes typically found at the base of nursery containers. Impermeable, as used herein, means that roots of plants therein cannot permeate, or grow through the pot. The fabric liner fits snugly in the pot and is capable of trapping the roots and directing the roots into the wall of the plastic pot to stop the apical dominance of the roots and to induce root branching in the container.

A novel plant preservation and growth control bag and a method of using the bag to preserve a plant after initially growing the plant in the ground and removing it are also provided. The plant preservation and growth control bag of this invention confines the roots of a plant and restricts its growth after the plant has been initially grown in the field and removed therefrom in anticipation of sale and transplantation. The bag includes an open top, a continuous side and a bottom. The continuous side of the bag is tapered inwardly from the open top to the bottom, and is formed of a fabric like the liner fabric described above, and is thus formed of a porous, needle punched fabric of fibers which are tangled and knotted as a result of being needle punched whereby plant roots are caught by the fabric. Penetration of the fabric by the roots is severely restricted. The bag is of an overall size which generally, but not necessarily, corresponds with the size of the root and soil mass produced when a plant is removed from the ground.

The method for preserving a plant while restricting its growth after the plant has been initially grown in the field and removed therefrom in anticipation of a sale, or transplantation, basically comprises the steps of placing the root and soil mass of the plant in a plant preservation and growth control bag of the invention, and providing water to the plant within the bag.

The fabric of the bag catches the plant roots as they grow within the bag, pruning the roots and preventing root circulation. However, the bag is of sufficient strength to severely restrict penetration of the fabric by the roots. As a result, except for a few small roots, the roots of the plant are confined within the bag. While the plant remains healthy in the bag, it does not appreciably grow while its roots are confined therein. Thus, the plant may be preserved for future sale by the grower for a long period of time.

It is therefore an object of the present invention to provide an improved method and apparatus for growing nursery stock prior to transplantation at a desired transplantation site, such as, but not limited to the ultimate landscape site, or a larger pot with a fabric liner thereon. Another object of the present invention is to provide an apparatus which catches growing root tips and directs them into an impermeable wall so that the apical dominance and growth thereof is stopped, the root is pruned, and root branching within the container occurs.

A further object of the present invention is to provide a commercially practical apparatus into which all parts, including the pot and the liner are reusable.

Other and further objects, features and advantages of the present invention will be readily apparent to those skilled in the art upon a reading of description of preferred embodiments which follows when taken in conjunction with the accompanying drawings.

BRIEF DESCRIPTION OF THE DRAWINGS

FIG. 5 is a perspective view of the wire basket and bag of FIG. 4 after the roots of a tree and soil have been placed therein.

FIG. 6 is a side partially sectional perspective view of a pot containing a growth control plant preservation bag having the roots of a tree and soil therewithin.

FIG. 7 is a perspective view of the root growth and soil mass of a tree after being preserved in a plant preservation bag of the present invention and the bag removed therefrom.

FIG. 8 is a side, partially sectional perspective view of the growing apparatus of the present invention having growing media and a plant therein.

FIG. 9 is a section view taken from line 9—9 of FIG. 5.

FIG. 10 is a perspective view of the liner of the present invention having been removed from the pot and being peeled away from the growing media.

FIG. 11 is a top view of the liner of the present invention.

FIG. 12 is a partial cross-sectional view of the growing apparatus of the present invention showing the tip of the root caught by the fabric liner and directed into the side of the pot of the present invention.

FIG. 13 is a perspective view of an air root pruning grid to be placed in a pot of the present invention.

DESCRIPTION OF THE PREFERRED EMBODIMENTS

Figure 1:
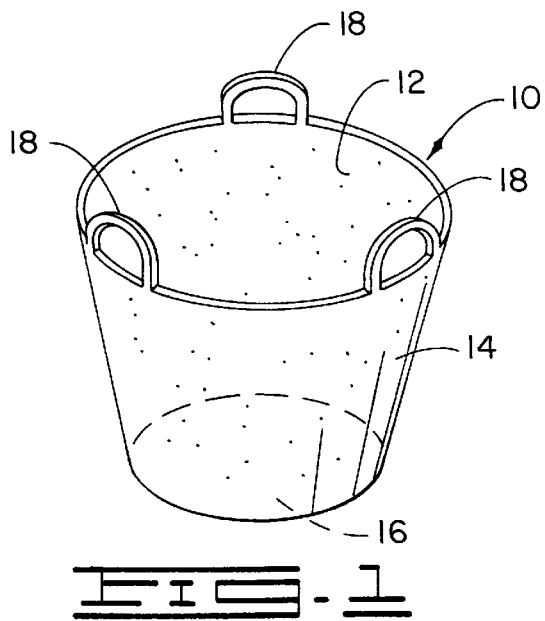
FIG. 1 is a perspective view of a plant preservation and growth control bag of the present invention.

Referring now to the drawings and particularly to FIG. 1, a plant preservation and growth control bag 10 of the present invention is illustrated. The bag 10 has a circular open top 12, a continuous side 14 and a circular bottom 16. The continuous side 14 is tapered inwardly from the open top 12 to the bottom 16. Thus, in the preferred configuration illustrated in FIG. 1, the bag 10 is of an inverted truncated cone shape.

While the bag 10 can have various other shapes, the tapered side 14 is essential in that it makes the bag 10 easily removable from the root growth and soil mass 11 of a plant which has been confined in the bag 10 for some period of time as shown in FIG. 7. Also, the inverted truncated cone shape of the bag 10 is preferred for the reason that it corresponds to the shape of the root and soil mass of a plant removed from the ground utilizing a conventional mechanized plant spade.

Figure 2:
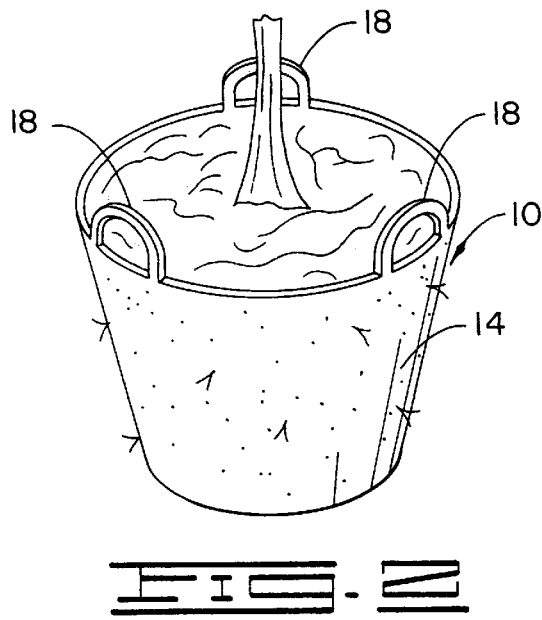
FIG. 2 is a perspective view of the plant preservation and growth control bag of FIG. 1 after the roots of a tree and soil have been placed therein.

In a particularly preferred form, the bag 10 includes two or more, and preferably three, handles 18 attached to the open top 12 thereof for lifting the bag 10 and the plant contained therein. FIG. 2 illustrates the bag 10 with the roots of a tree and soil therein.

Figure 3:
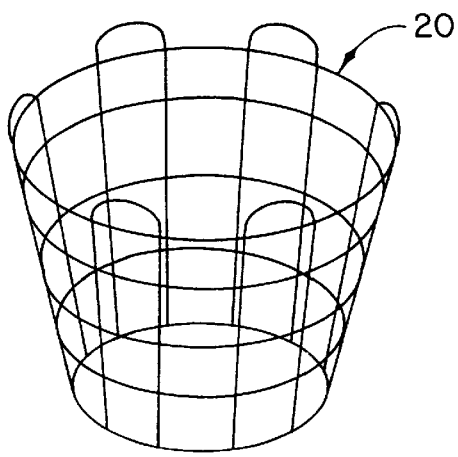
FIG. 3 is a perspective view of a prior art wire basket utilized for receiving the roots and soil of a plant removed from the ground using a conventional tree spade.

Referring now to FIG. 3, a prior art wire basket 20 is shown which has heretofore been utilized by tree growers. The basket 20 has an inverted truncated cone shape for receiving the roots and soil of a tree when the tree is removed from the ground using a conventional mechanized tree spade. The wire basket 20 is utilized for moving the tree and for facilitating its transplantation.

Figure 4:
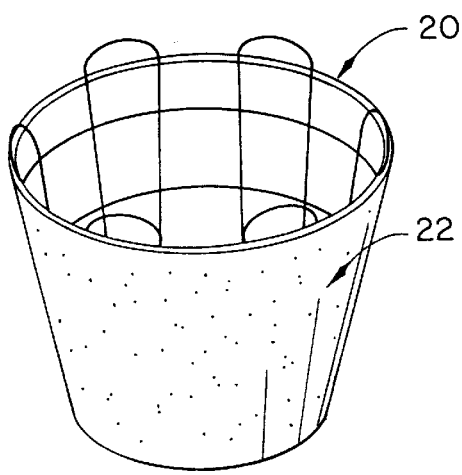
FIG. 4 is a perspective view of the wire basket of FIG. 3 having a plant preservation and growth bag of the present invention placed therearound.

As illustrated in FIG. 4, a plant preservation and growth control bag 22 of the present invention can be placed in or over the prior art wire basket 20 so that the method of the present invention can be performed using the prior art basket. 20. FIG. 5 illustrates the wire basket 20 and bag 22 with the roots of a tree and soil therein.

As mentioned, the plant preservation and growth control bags 10 and 22 are formed of a porous, needle punched fabric of fibers which are tangled and knotted as a result of being needle punched whereby roots growing within the bags are caught by the fabric, but penetration of the fabric by the roots is restricted and curtailed.

A suitable porous, needle punched fabric for use in accordance with the present invention is a non-woven fabric marketed by Amoco Corporation, formally by Phillips Fibers Corporation. Typically, the fabric is manufactured from synthetic staple fibers made into batts. The batts are subjected to stretching while being needle punched. The methods and equipment for producing the fabric are described in U.S. Pat. Nos. 4,042,655 issued to Platt et al. in August, 1977; 4,154,889 issued to Platt in May, 1979 and 4,199,644 issued to Platt in April, 1980.

The fabric of staple fibers which is needle punched can be formed using fibers of polyolefin, polyester, polyamide or mixtures thereof. A preferred such staple fiber fabric for forming the plant preservation bag of the present invention is a heavy (8 ounces or heavier) fabric formed of polypropylene staple fibers which is strongly heat bonded on one side. The heat bonded side of the fabric is placed on the outside of the bag with the non-heat bonded rough side on the inside of the bag to catch root tips, induce root branching and prevent root circulation. A particularly suitable such non-woven staple fiber fabric for use in accordance with this invention is manufactured by Synthetic Industries, Atlanta, Ga., and identified as ST 80 fabric (8 ounces) having a puncture strength of 115 pounds.

Heavy needle punched fiber fabrics which are formed of continuous fibers can also be utilized. For example, non-woven needle-punched fabrics formed of continuous polyolefin fibers, polyester fibers and/or polyamide fibers can be used. As in the case of staple fiber fabrics, the continuous fiber fabrics are preferably 8 ounces or heavier and are fused by heating after being tangled and knotted by needle punching to provide strength for resisting root penetration and for resisting the enlargement of those roots that do penetrate the fabric. A particularly suitable porous, needle punched fabric formed of non-woven continuous fibers is manufactured by Polyfelt Incorporated of Evergreen, Ala. under the trade designation "TS".

Another fabric which is suitable for use in accordance with this invention is formed of woven continuous fibers. The woven continuous fibers form a substrate and prior to being needle punched, one or more layers of staple fibers are placed on the substrate. The staple fibers and substrate are then needle punched whereby the staple fibers are attached to one side of the substrate forming a highly fuzzy surface thereon.

The continuous and staple fibers are preferably selected from the group consisting of polyolefin fibers, polyester fibers, polyamide fibers and mixtures thereof. Most preferably, both the continuous fibers and staple fibers are formed of polypropylene. When the resulting fabric is utilized to form a bag in accordance with the present invention, the fuzzy surface is placed on the inside of the bag whereby root tips are readily caught therein and prevented from circulating within the bag. A suitable fabric of this type is manufactured by the Polymers Group of Exxon Chemical Company.

Thus, the plant preservation and growth control bag of the present invention can be formed of staple or continuous fibers, or both, selected from polyolefin fibers, polyester fibers and/or polyamide fibers. However, it is essential to the present invention that the fiber fabric utilized be a heavy fabric which has been tangled and knotted by needle punching to the degree that a major portion of the root tips growing within the fabric do not penetrate the fabric and that any root tips that do penetrate are choked off by the fabric whereby they do not enlarge outside the fabric. As indicated, increased strength can be imparted to the fabric by heat bonding the fibers. The present invention thus provides a method for preserving a plant while restricting its growth after the plant has been initially grown in the field and removed therefrom in anticipation of a sale and transplantation to an ultimate landscape site.

In accordance with the present invention, when the plants grown for transplantation are removed from the field, the root and soil masses are placed in plant preservation bags of the present invention instead of being wrapped in burlap. As mentioned, the root and soil masses can each be placed in a bag 10 having handles 18 thereon for facilitating the subsequent movement and transplantation of the plants as shown in FIG. 2. Alternatively, the root and soil masses can each be placed in a prior art wire basket 20 having a plant preservation bag 22 around or in the basket as shown in FIG. 5.

Once the plants are placed in the preservation bags of this invention with or without wire baskets, the bags containing the plants can be placed on top of the ground and supplied with water or the bags and roots can be put back into the ground. In either arrangement, root tips within the bags are caught by the bags but are substantially prevented from penetrating the bag. Because the roots are caught by the bag, they are substantially prevented from circling therewithin. Any root tips which do penetrate the bags are air pruned when the bag is above ground or choked off when the bag is below ground, inducing new root branching within the bag. Also, if needed to provide stability to the plants, the bags containing the root and soil masses with or without wire baskets, can be placed in above-ground or in-ground pots like the pot 24 shown in FIG. 6.

Referring now to FIG. 8, a plant-growing apparatus 110 of the present invention is illustrated. Growing apparatus 110 comprises a container 115 which is preferably a pot and more preferably a plastic pot 115 having a fabric sleeve or liner 120 disposed therein. The pot and sleeve combination is at least partially filled with a soil or other growing media 125. Nursery stock, or other plant to be grown 130 is placed in the growing media for growing in apparatus 110. As better seen in FIG. 9, a fabric spacer, or disc 135 may be placed adjacent to the bottom of the pot below growing media 125.

Pot 115 has a top 140, a side wall 142 which is preferably slightly tapered from top to bottom, and a bottom 144. A plurality of drain holes 146 may be defined through side wall 142 near bottom 144. Pot 115 has an outer side or outer surface 150 and an inner side or inner surface 152.

Fabric liner 120 has inner surface 160 and outer surface 162. Preferably, outer surface 162 is smooth, and is placed snugly in pot 115 so that outer surface 162 thereof is adjacent inner surface 152 of pot 115. Inner surface 160 is a rough, or fuzzy surface capable of trapping and directing root tips into side wall 142 of pot 115 as will be explained in detail hereinbelow.

Figure 14:
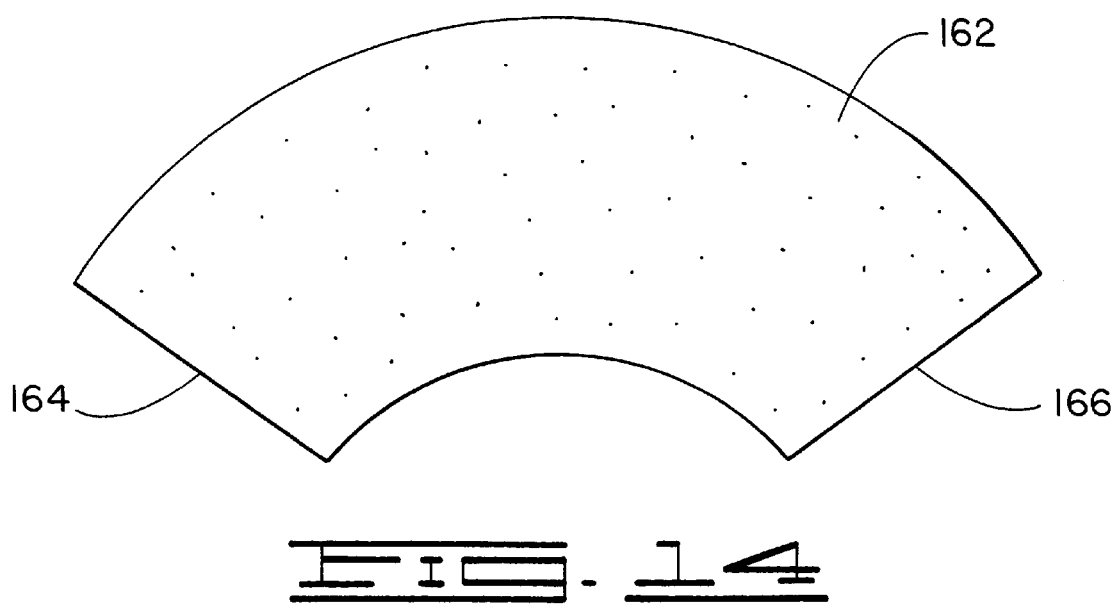
FIG. 14 shows a plan view looking down on an embodiment of the fabric liner of the present invention laid out flat.
Figure 15:
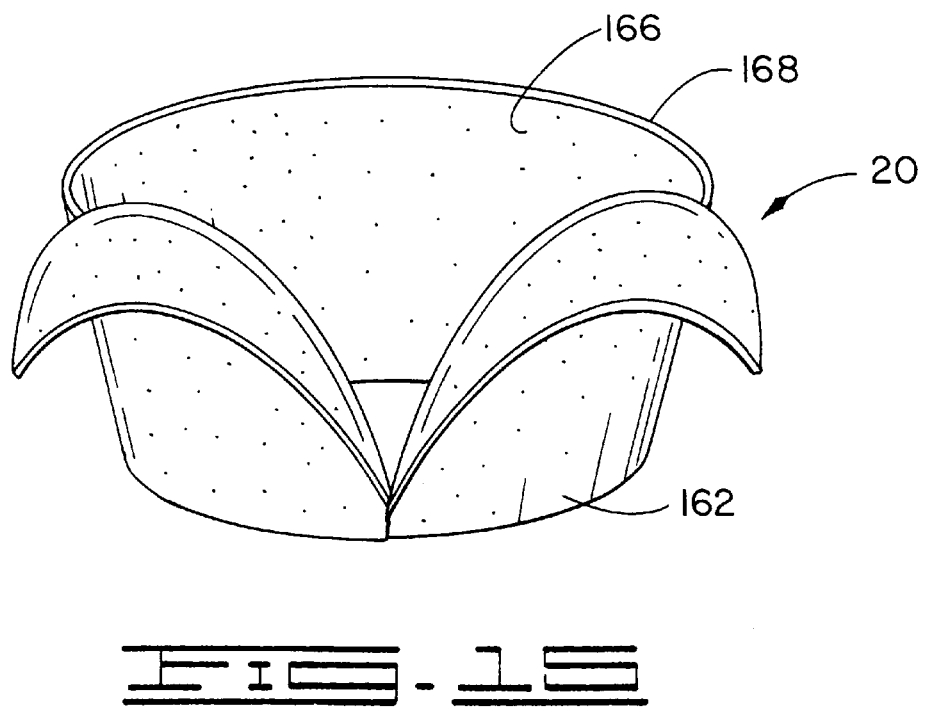
FIG. 15 shows the fabric liner outside the pot with the overlapping ends attached to one another.

As shown in FIGS. 11 and 14, liner 120 preferably has first and second ends 164 and 166 respectively. First and second ends 164 and 166 preferably overlap when placed in pot 115. As shown in FIG. 8, liner 120, when placed in pot 115 is adapted to the shape and configuration of the inner surface of the pot so that a snug fit between liner 120 and pot 125 is achieved. Preferably, liner 120 defines an open top 168 and an open bottom 170 when shaped to fit in pot 115. First and second ends 164 and 166 may be attached to one another at the overlapping portion thereof with a sewn thread, or stitch 171 by sewing, or by stapling or other attachment means near the bottom 170 thereof as shown in FIGS. 10 and 13. The staple, or stitch helps liner 120 hold its shape when placed in a pot.

As set forth above, a fabric disc 135 may be placed in the bottom of pot 115. Although in the embodiment described herein, liner 120 has first and second ends and an open bottom, liners conforming to the shape and size of desired pots can be made with a closed bottom and a continuous side. However, one of the advantages of utilizing a sleeve with first and second ends is that, as shown more clearly in FIG. 10, once liner 120 and growing media 125 along with the plant grown in the pot are removed therefrom, liner 120 can be easily removed from the growing media simply by peeling the fabric away from the growing media. Another advantage of a sleeve with first and second ends is that there is no need to cut the fabric to remove it from the growing media. Because the fabric is not cut, re-use is easier. The stitch 171 can help hold the shape of the sleeve during re-use, assuring that the fuzzy inner side will be placed on the inner side of the pot.

Referring now to FIG. 9, a schematic of a root system 180 having roots 182 is shown. The schematic of FIG. 9 shows a plant which has been growing in the media such that some root tips 184 have reached the surface of fabric liner 120. As shown in FIG. 9 and in the partial section view in FIG. 12, the root tip 184 of each root 182 that reaches the fabric will be trapped or grabbed by the fuzzy inner surface 160 of fabric liner 120. The inner surface of the fabric will grab root tip 184 in such a way as to prevent any root circling in the pot 115. Roots 182 will attempt to continue to grow and will begin to try to penetrate fabric liner 120. However, liner 120 will direct root tips 184 into the inner surface 152 of pot 115. Root tips 184 are therefore held in place and pressed against inner surface 152 of pot 115 which results in the loss of apical dominance of the roots. Some root tips may actually penetrate the fabric liner while others will be held in place and will not penetrate the fabric liner. In any event, root tips 184 will be directed into the wall of pot 115 to stop the apical growth of roots and to prevent root circling. Those root tips that penetrate will be in direct contact with the wall 142 of pot 115, and those that do not will be pressed into wall 142 and held in place.

Because roots 182 lose their apical dominance, roots 182 will branch in pot 115. As shown in FIGS. 9 and 12, roots 182 have branched roots 186 growing therefrom and extending into the surrounding growing media. As the plant continues to grow, root branches 186 will further enlarge, and more root branches 186 will develop. When plant 130 is grown to the capacity of pot 115, a fibrous root system will have developed due to the root branching that occurs in the pot which will allow for a successful transplantation. When placed in a transplantation site, branched roots 186 will extend into the surrounding growing media thereby attaching the tree thereto and providing water and nutrients to the tree.

The non-woven fabrics previously described herein, both continuous and staple fiber, are suitable for use to make liner 120 of the present invention. One particularly suitable porous, needle-punched fabric from which the liner of the present invention may be made is the eight-ounce, nonwoven fabric marketed by Synthetic Industries described above. Although the preferred fabric is an eight-ounce fabric, the fabric may be more or less than eight ounces. Preferably, however, the fabric is at least a four-ounce fabric.

Thus, the sleeve of the present invention can be formed of staple or continuous fibers, or both, selected from polyolefin fibers, polyester fibers and/or polyamide fibers. However, it is essential to the growing apparatus of the present invention that the fiber fabric utilized be a heavy fabric which has been tangled and knotted by needle punching to the degree that the majority of the root tips will be grabbed by the fabric and will be directed into the wall of the pot of the present invention to stop the apical dominance thereof. Any root tips that begin to penetrate the fabric will thus be directed into the wall of the pot.

Liner 120 is preferably heat bonded on one side to provide a smooth surface and to provide stiffness to the liner 120 so that it will not slump in pot 125 but will stay substantially erect. The stiffness allows fabric liner 12 to hold its shape against inner surface 152 of pot 115, so that it will not collapse into pot 115 as it is filled with growing media. Outer surface 150 comprises the heat-bonded side of liner 120, and is placed adjacent the inner surface 152 of pot 115. The non-heat-bonded, rough or fuzzy side of liner 20 comprises inner surface 162 of liner 120.

The method of the present invention thus comprises placing a fabric liner snugly inside an impermeable pot, filling the fabric liner with a growing media, planting and growing a plant in the media. The method further comprises trapping the roots of the plant with the fabric liner as the plant is growing to prevent root circling within the pot and directing the roots into an inner side of the pot to stop the apical dominance of the root thereby pruning the root and producing root branching and a fibrous root system inside the pot. The fabric liner preferably comprises a sleeve so that the placing step comprises overlapping the first and second ends of the sleeve and adjusting and conforming the sleeve to the shape and size of the pot to produce a snug fit. A fabric: spacer is preferably placed in the bottom of the pot prior to filling with the growing media. The method may further comprise removing the liner and the plant after the plant has been grown to a desired size in the pot and peeling the liner away from the plant-growing media and placing the plant at a desired growing location. Both the liner and the pot can be reused for growing other plants or nursery stock therein. The liner is thus easily removable and is reusable, and the pot is reusable, thus providing an advantage over prior art pruning-type pots.

The method and apparatus of the present invention provides an advantageous method and apparatus for growing plants and is more economical and commercially practicable than other methods. Air root pruning pots and copper-lined pots kill the end of the root whereas the present apparatus simply stops the apical dominance of the root to induce root branching. Although the stair step pot set forth in U.S. Pat. No. 4,442,628 root prunes, it is much more expensive to manufacture. Likewise, more expense is involved with copper-lined pots since only one plant can be grown and root pruned in the pot. If it is desired to utilize the pot for root-pruning again, it must first be cleaned and then relined with copper coating, which is typically cost prohibitive. Liners of the present invention can be designed to fit snugly inside the wall of standard poly pots of various sizes such as, but not limited to, one, three, five, seven, ten, fifteen or twenty gallon pots so that the use of such liners is not only effective, but economical.

The preferred embodiment shown utilizes a fabric disk at the bottom of a pot. However, a false bottom which comprises an air root pruning grid 192 may be used. A schematic of false bottom 190 is shown in FIG. 18 and simply comprises a table-like structure with legs 194 and grid 192. False bottom 190 is placed on the bottom of pot 115 beneath growing media 125. Air root pruning grid 192 prunes roots that extend downwardly through the growing media.

The method of growing herein is distinct from prior art methods in that it allows a plant to grow to the capacity of the container in which it is being grown, while preventing root circling and creating a fibrous root system in an economical manner. Although growing plants in bags is disclosed in prior patents of Applicant herein, the method of growing therein simply comprises grabbing the roots and constricting them but allowing roots to penetrate through the bag and grow outside the bag. Thus, when such bags are in the ground, the plant grown therein continues to be nourished by those roots growing outside the bag. Contrarily, the instant invention comprises completely stopping the apical dominance of the root tip at the pot surface which causes root branching so that the plant will grow to its desired size in the container. Once it has reached the desired size, the liner and plant can be removed from the pot, the liner removed from the rooted growing media and the plant placed in a desired transplantation site which may be a larger pot or which may be in the ground.

Thus, the present invention is well adapted to carry out the objects and attain the ends and advantages mentioned as well as those which are inherent therein. While numerous changes in the steps of and fabrics utilized in accordance with the methods of this invention can be made by those skilled in the art, such changes are encompassed within the spirit of this invention as defined by the appended claims.

What is claimed is:

1. A method of growing nursery stock intended for transplanting, comprising:

placing a fabric liner snugly inside a pot, wherein said fabric liner comprises an adjustable sleeve having first and second ends, said placing step comprising overlapping said first and second ends so that said sleeve is adjusted to conform to the shape and size of said pot;

placing a separate fabric spacer in said bottom of said pot;

filling said fabric liner with growing media;

planting and growing a plant in said growing media;

trapping the roots of said plant with said fabric liner and said fabric spacer as said plant is growing to prevent root circling within said pot; and directing said roots into an inner surface of said pot to stop the apical dominance of said trapped roots and to produce root branching inside said pot.

2. The method of claim 1, wherein said liner and said spacer are comprised of the same material.

3. In a method for growing a plant intended for transplanting wherein the roots of plants are confined to impermeable above-ground containers filled with growing media, the improvement comprising:

inserting a removable and reusable fabric liner into said impermeable container prior to filling said container with said growing media, wherein said liner fits snugly in said container and is capable of trapping said roots and directing said roots into a wall of said container to stop the apical growth of said roots and induce root branching in said container, said liner having an open top and an open bottom and being conformed to the shape of said pot; and placing a disk made from said fabric in a bottom of said container prior to filling said container with said growing media.

* * * * *

UNITED STATES PATENT AND TRADEMARK OFFICE
CERTIFICATE OF CORRECTION

PATENT NO. : 6,202,348 B1
DATED : March 20, 2001
INVENTOR(S) : Ralph E. Reiger

It is certified that error appears in the above-identified patent and that said Letters Patent is hereby corrected as shown below:

Title page,
Under "Related U. S. Application Data," delete "08/691,442 and insert -- 08/691,422 -- therefor; delete "Pat. No. 5,799,251" and insert -- abandoned -- therefor.

Column 1,
Line 7, delete "08/691,442" and insert -- 08/691,422 -- therefor;
Line 8, delete "U.S. Pat. No. 5,799,251" and insert -- abandoned -- therefor.

Signed and Sealed this

Twenty-seventh Day of November, 2001

Attest:

NICHOLAS P. GODICI
*Attesting Officer*    *Acting Director of the United States Patent and Trademark Office*